United States Patent
Humphrey et al.

(10) Patent No.: US 10,671,051 B2
(45) Date of Patent: Jun. 2, 2020

(54) THERMAL EVENT DETECTION IN ELECTRICAL SYSTEMS

(71) Applicant: HEWLETT PACKARD ENTERPRISE DEVELOPMENT LP, Houston, TX (US)

(72) Inventors: Daniel Humphrey, Houston, TX (US); David A. Moore, Houston, TX (US); Stewart Gavin Goodson, II, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 49 days.

(21) Appl. No.: 16/155,842

(22) Filed: Oct. 9, 2018

(65) Prior Publication Data
US 2020/0110381 A1    Apr. 9, 2020

(51) Int. Cl.
G05B 19/406    (2006.01)
H02J 13/00     (2006.01)

(52) U.S. Cl.
CPC ........ *G05B 19/406* (2013.01); *H02J 13/0017* (2013.01); *G05B 2219/49219* (2013.01)

(58) Field of Classification Search
None
See application file for complete search history.

(56) References Cited

U.S. PATENT DOCUMENTS

| | | | |
|---|---|---|---|
| 8,223,025 B2 | 7/2012 | Stiver et al. | |
| 8,595,379 B1 | 11/2013 | Brandwine | |
| 9,342,981 B1 | 5/2016 | Nay et al. | |
| 9,766,684 B2 | 9/2017 | Patel et al. | |
| 2008/0313492 A1 | 12/2008 | Hansen | |
| 2012/0133333 A1* | 5/2012 | Morioka | H01M 10/441 320/134 |
| 2017/0214273 A1* | 7/2017 | Kogo | H02J 3/46 |

OTHER PUBLICATIONS

Haifeng Gong et al., "Thermal Management in Rack Scale Architecture System with Shared Power and Shared Cooling," 32nd SEMI-THERM Symposium, Apr. 25, 2016, pp. 171-176. IEEE.

* cited by examiner

*Primary Examiner* — Ryan A Jarrett
(74) *Attorney, Agent, or Firm* — Nolte Intellectual Property Law Group (57) ABSTRACT

A method for detecting thermal events in an electrical system includes: synchronizing, via a controller, measurements of power consumed by each of a plurality of load elements during an interval with one another and with measurements of power supplied by each of a plurality of power sources to the plurality of load elements during the interval; determining a differential between a sum of the power consumed by the load elements during the interval and a sum of the power supplied by the power sources to the plurality of load elements during the interval; comparing the differential to a predetermined threshold; and determining whether a thermal event has occurred based on the comparison of the differential to the predetermined threshold.

20 Claims, 7 Drawing Sheets

THERMAL EVENT DETECTION IN ELECTRICAL SYSTEMS

BACKGROUND

An electrical system, such as a data center, includes a multitude of loads consuming power supplied by a plurality of power sources. Such loads may include, for example, computing devices, such as servers including a multitude of electronic components (e.g., central processing units (CPUs), graphical processing units (GPUs), and memory devices). As CPUs, GPUs, and other electronic components (e.g., memory devices) decrease in size, servers, are in turn able to increase the number of such electronic components utilized. Likewise, enclosures installable in server racks have been constructed to house an increased number of servers for certain computing applications.

In operation, a substantial portion of the power supplied to each electronic component included in a computing device is transformed into heat. Generally, as the number of electronic components and computing devices utilized in the electrical system increases, the amount of heat generated is increased. Accordingly, additional loads in the electrical system may include cooling systems to reduce the raised temperatures of the electronic components to prevent impairment or failure of the electronic components. To ensure sufficient power is provided to the loads, the electrical system typically includes redundant power sources to ensure that up to twice the designated maximum power of the electrical system is available at any given time.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10% unless otherwise expressly specified. Moreover, examples herein are intended to be illustrative only and are presented for discussion purposes and not by way of limitation.

An electrical system, such as a data center, may include a multitude of computing nodes, their associated storage hierarchies, and interconnection infrastructure. The computing nodes may include a variety of computing devices, such as, for example, servers. Each computing device is typically constructed from a plurality of electronic components. Example electronic components may include, but are not limited to, CPUs, GPUs, and memory devices, such as dual inline memory modules (DIMMs).

As noted above, in operation, each of the electronic components generates heat. Accordingly, the electrical system may implement an air-cooling system, a liquid-cooling system, or a combination thereof to reduce the heat generated by the electronic components to prevent impaired performance or failure of the electronic components, and in turn, the computing devices. In air-cooled electrical systems, fans, compressors, and air conditioners may be implemented to cool the electronic components. In liquid-cooled electrical systems, pumps may be implemented to circulate a liquid coolant to cool the electronic components of the computing devices.

Based on the number and types of loads (e.g., computing nodes, cooling components, and related infrastructure), the electrical system further includes a plurality of power sources to supply power to be consumed by the loads. To ensure sufficient power is provided to the loads, the electrical system typically includes redundant power sources to ensure that up to twice the designated maximum power of the electrical system is available at any given time.

Example power sources in electrical systems, such as data centers, may be configured to supply between about ten kilowatts and about forty kilowatts of power. Accordingly, protection schemes have been implemented in such high-power electrical systems to prevent the occurrence of a thermal event. For purposes of this disclosure, a thermal event refers to a situation in which the temperature of a component in the electrical system rises sufficiently high enough to cause at least impairment of the performance of the component. In some instances, the thermal event may refer to a situation in which the temperature of a component in the electrical system rises sufficiently high enough to cause failure of the component. In other instances, the thermal event may refer to a situation in which the temperature of a component in the electrical system rises sufficiently high enough to cause irreversible physical damage to the component and adjacent components and/or structures. In some instances, the thermal event may be a propagating thermal event, in which irreversible physical damage may progress from component to component in the electrical system, often forming new "short" circuits as the thermal event propagates.

One established protection scheme to prevent the occurrence of a thermal event is the implementation of an overcurrent protection circuit in each power supply. Another established protection scheme to prevent the occurrence of a thermal event is the implementation of an undervoltage protection circuit in each power supply. Yet another established protection scheme to prevent the occurrence of a thermal event is the implementation of an overcurrent protection device in each load. The overcurrent protection device may be an electronic fuse, a circuit breaker, or some other type of current-limiting device. The overcurrent protection device is designed to protect the load against a thermal event by protecting the load from the effects of overcurrent.

Although effective in some instances, overcurrent protection circuits are ineffective in some electrical systems as the amount of current generating a thermal event in high-power electrical systems is often less than the amount of current to trigger the overcurrent protection scheme. Additionally, an undervoltage protection circuit may not detect an undervoltage as the power supplies may be capable of maintaining regulation of the voltage at that current. Further, overcurrent protection devices at the loads may not protect against thermal events occurring between the power supplies and the loads.

Accordingly, examples of the present disclosure are directed to electrical systems capable of detecting thermal events in a manner that addresses the drawbacks of the aforementioned thermal event detection systems and methods. Particularly, in one or more examples of the present disclosure, an electrical system is provided that is capable of detecting a thermal event regardless of the location of the thermal event in the electrical system. In the examples of the present disclosure, the detection of the thermal event is not dependent on detecting an overcurrent or undervoltage in the power supplies or at a load in the electrical system.

More particularly, in one example of the present disclosure, a method is provided for detecting thermal events in an electrical system. The method may include synchronizing, via a controller, measurements of power consumed by each of a plurality of load elements during an interval with one another and with measurements of power supplied by each of a plurality of power sources to the plurality of load elements during the interval. The method may also include determining a differential between a sum of the power consumed by the load elements during the interval and a sum of the power supplied by the power sources to the plurality of load elements during the interval. The method may further include comparing the differential to a predetermined threshold, and determining whether a thermal event has occurred based on the comparison of the differential to the predetermined threshold.

In another example of the present disclosure, an electrical system is provided and may include a plurality of power sources, a plurality of load elements, a first plurality of power telemetry controllers, a second plurality of power telemetry controllers, a main controller, and a computer-readable storage medium. The plurality of power sources may operate in parallel with one another to supply power. The plurality of load elements may be powered by the plurality of power sources. Each power telemetry controller may be communicatively coupled to a respective load element to measure the power consumed by the respective load element during an interval. Each power telemetry controller of the second plurality of power telemetry controllers may be communicatively coupled to a respective power source to measure the power supplied by the respective power source during the interval. The main controller may be communicatively coupled to each of the first plurality and second plurality of power telemetry controllers. The computer-readable storage medium may include instructions executable by the main controller to: synchronize measurements of the power consumed by each of the load elements during the interval with one another and with measurements of the power supplied by each of the power sources during the interval; determine a differential between a sum of the power consumed by the load elements during the interval and a sum of the power supplied by the power sources during the interval; and stop the power sources from supplying power in response to the differential exceeding a predetermined threshold.

In another example of the present disclosure, a non-transitory computer-readable medium is provided and includes computer executable instructions stored thereon that when executed by a processor, cause the processor to: synchronize measurements of power consumed by each of a plurality of load elements during an interval with one another and with measurements of power supplied by each of a plurality of power sources to the plurality of load elements during the interval; determine a differential between a sum of the power consumed by the load elements during the interval and a sum of the power supplied by the power sources to the plurality of load elements during the interval; and stop the power sources from supplying power in response to the differential exceeding a predetermined threshold.

Figure 1:
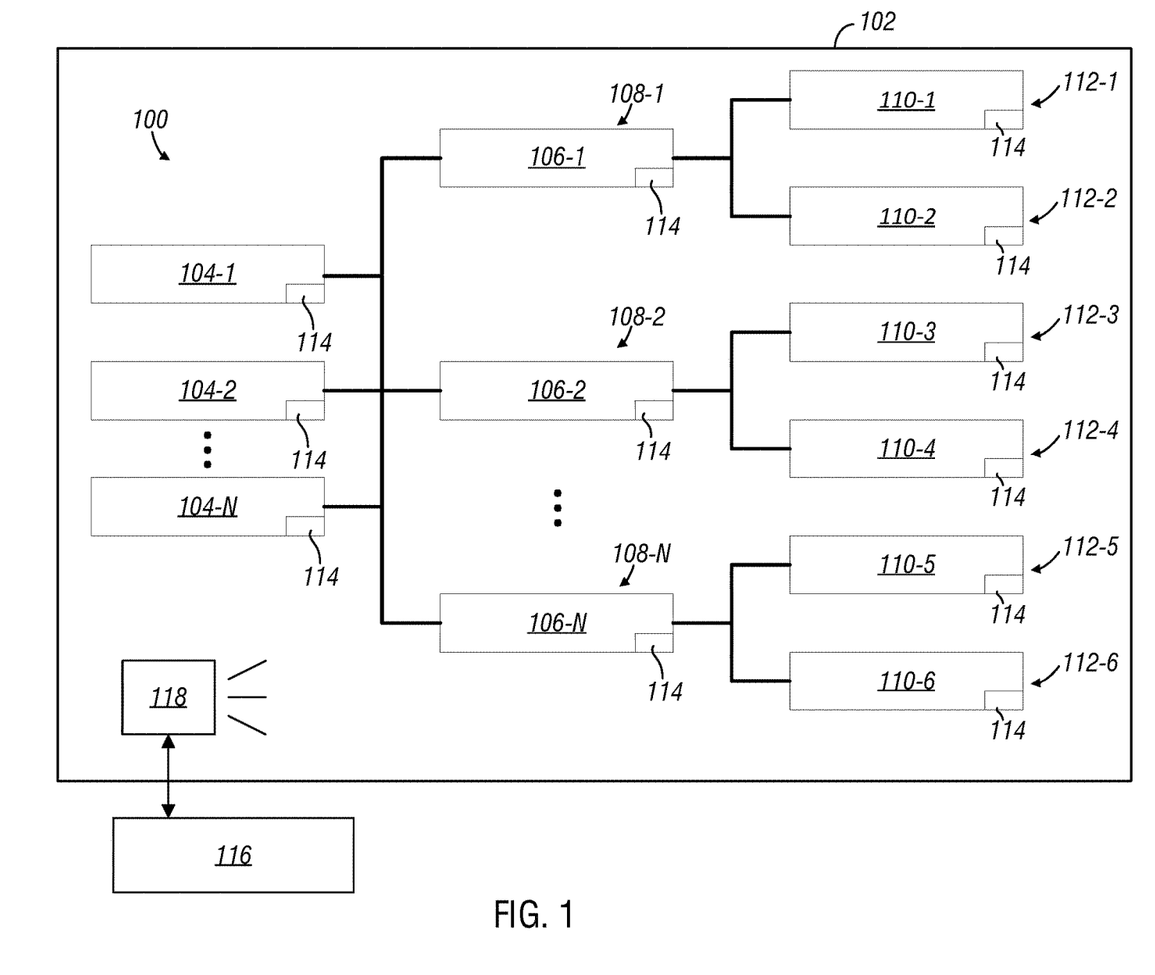
FIG. 1 is a block diagram of an electrical system, according to one or more examples of the disclosure.

Turning now to the drawings, FIG. 1 is a block diagram of an electrical system 100, according to one or more examples of the disclosure. In one or more implementations, the electrical system 100 may be part of a data center (not shown) electrically coupled to an electrical power grid (not shown). As illustrated in FIG. 1, the electrical system 100 is housed in an enclosure 102. The enclosure 102 may be installed in a server rack (not shown) along with a plurality of other enclosures or chassis in a stacked arrangement. In one or more implementations, a plurality of server racks and accompanying infrastructure may be included in the datacenter.

As illustrated in FIG. 1, the electrical system 100 includes a plurality of power sources 104-1 through 104-N (also referred to collectively as power sources 104 or individually and generally as a power source 104) electrically coupled to a plurality of load elements 106-1 through 106-N (also referred to collectively as load elements 106 or individually and generally as a load element 106). As electrically coupled, the plurality of load elements 106 may consume power supplied by the plurality of power sources 104 in parallel. The plurality of power sources 104 may include redundant power sources 104 to ensure sufficient power is provided to the load elements 106 to drive each load element 106 at full utilization. Accordingly, in one or more implementations, the electrical system 100 may be N+N redundant, where N is the number of power sources 104 dedicated to power the load elements 106. In other implementations, the electrical system 100 may be N+1 redundant. In either implementation, redundancy provides the electrical system 100 with an available power supply greater than the power consumed by the load elements 106.

As shown in FIG. 1, the plurality of load elements 106 may be grouped into load domains 108-1 through 108-N (also referred to collectively as load domains 108 or individually and generally as a load domain 108). As grouped, each load domain 108 may include one or more load elements 106 (one load element 106 is shown per load domain 108 in FIG. 1). For example, the load domains 108 may include, but are not limited to, compute nodes, cooling nodes, network nodes, storage nodes, management nodes, and power nodes. Accordingly, the load elements 106 may be, for example, servers or other like computing devices in which a load domain 108 is a compute node. In another example, the load elements 106 may be, for example, gateway devices, switches, routers, and/or access points in which a load domain 108 is a network node. In yet another example, the load elements 106 may be power distribution units in which the load domain 108 is a power node.

The load elements 106 may include load subelements 110-1 through 110-6 (also referred to collectively as load subelements 110 or individually and generally as a load subelement 110). Each load element 106 may include a plurality of load subelements 110, two shown for each load element 106 in FIG. 1, or in other implementations, one or more load elements 106 may have more than two load subelements 110, one load subelement 110, or no load subelements 110. Additionally, in implementations in which the load subelements 110 may be further subdivided or partitioned for power metering as will be discussed in greater detail below, the load subelements 110 may be grouped into load subdomains 112-1 through 112-6 (also referred to collectively as load subdomains 112 or individually and generally as a load subdomain 112).

Example load subelements 110 may include processors (e.g., CPUs and GPUs), memory devices, and peripheral component interconnects (PCIs) in implementations in which the load element 106 is a server or other computing device. In another example, load subelements 110 may be a plurality of fans in implementations in which the load element 106 is a cooling assembly. In yet another example, load subelements 110 may be a plurality of storage modules in implementations in which the load element 106 is a storage node.

A respective power telemetry controller 114 may be communicatively coupled to each power source 104, load element 106, and load subelement 110 in the electrical system 100. In some implementations, the power telemetry controller 114 may be embedded in the respective power source 104, load element 106, and load subelement 110, as shown in FIG. 1. In other implementations, each power telemetry controller 114 may be wirelessly connected to the respective power source 104, load element 106, and load subelement 110 via a network 116.

The network 116 may be a private network, or in other implementations, the network 116 may be a public network, such as the Internet. As used herein, a public network is a network that may be shared by any number of entities. A public network may have unrestricted access, such that any user may connect to it. The network 116 may include any number of intermediate network devices, such as switches, routers, gateways, and/or servers, that are not directly illustrated as part of the network but that facilitate communication between the controller and the respective power source 104, load element 106, and load subelements 110 of the electrical system 100.

Each power telemetry controller 114 may meter the power supplied (in the case of power sources 104) and the power consumed (in the case of load elements 106 and load subelements 110) in the electrical system 100. Each power telemetry controller 114 may further be communicatively coupled to a main controller 118 of the electrical system 100.

The main controller 118 may be communicatively coupled to each power telemetry controller 114 via a wired connection, or as shown in FIG. 1, via a wireless connection. Each of the power telemetry controllers 114 may be in communication with the main controller 118 via the network 116.

Each of the power telemetry controllers 114 communicatively coupled to the power sources 104 may measure the power supplied by the respective power source 104 over an interval as determined by the main controller 118. Likewise, each of the power telemetry controllers 114 communicatively coupled to the load elements 106 and load subelements 110 may measure the power consumed by the respective load element 106 or load subelement 110 over the interval as determined by the main controller 118.

The interval may be established by a logic signal or a data packet generated by the main controller 118. Accordingly, in implementations utilizing a logic signal, the interval may be the time between changes in state of the logic signal. Thus, for each interval, each power telemetry controller 114 communicatively coupled to a power source 104 may measure the power supplied by the respective power source 104, and each power telemetry controller 114 communicatively coupled to a load element 106 or a load subelement 110 may measure the power consumed by the respective load element 106 or load subelement 110.

The measurements for each power telemetry controller 114 in the electrical system 100 may be synchronized with the logic signal. Thus, each measurement may start at a change in state of the logic signal, thereby beginning the interval, and may stop at the next change in state of the logic signal, thereby ending the interval. Correspondingly, the next interval may start at the end (change in state of the logic signal) of the previous interval and end at the next change in state of the logic signal. Thus, in some implementations, the intervals occur on a periodic basis; however, the present disclosure is not limited thereto, and in some implementations, the logic signal is aperiodic.

In one or more implementations, the logic signal may be a clock signal generated by the main controller 118. The frequency of the logic signal may be based in part on setting the intervals to allow for the main controller 118 to receive the measurements from all of the power telemetry controllers 114, while preventing prolonged propagation of a thermal event. An example interval may be from about 100 ms to about 250 ms. Other example intervals may be longer than about 250 ms or may be shorter than about 100 ms.

The measurements by each power telemetry controller 114 are stored in memory (see FIG. 2, 205) and transmitted after each interval to the main controller 118. In one or more implementations, the main controller 118 may poll each power telemetry controller 114 after a change in state of the logic signal to transmit the stored measurements from the previous interval. In another implementation, each power telemetry controller 114 may automatically transmit the respective stored measurement from the previous interval to the main controller 118.

Figure 2:
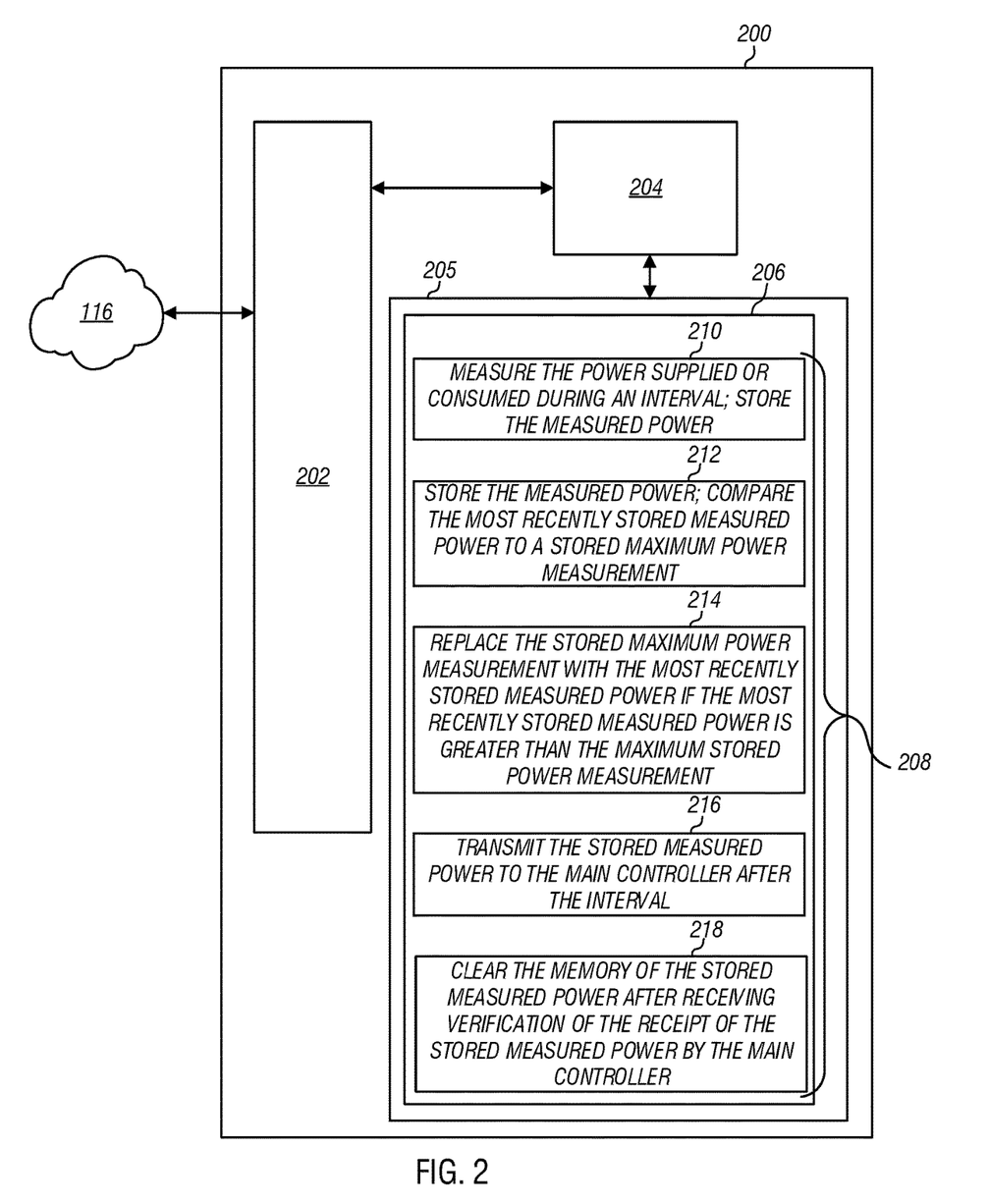
FIG. 2 is a block diagram of a power telemetry controller communicatively coupled to the network shown in FIG. 1, according to one or more examples of the disclosure.

Each power telemetry power controller 114 may also include a maximum energy measurement for power supplied or power consumed in memory (see FIG. 2, 205). After each interval, each power telemetry controller 114 may compare the measurement stored from the most recent interval (i.e., the immediate previous interval) to a respective maximum energy measurement stored in memory (see FIG. 2, 205). If the measurement from the previous interval is greater than the stored maximum energy measurement, the measurement from the previous interval may be stored as the maximum energy measurement, thereby replacing the previous maximum energy measurement. Such a maximum energy measurement may be utilized as substitute data, as evidenced below.

After transmitting the measurement of the power supplied or power consumed, the main controller 118 may send verification of the receipt of the measurement to the respective power telemetry controller 114. Upon receipt of the verification, the power telemetry controller 114 may clear the measurement taken during the previous interval from memory (see FIG. 2, 205). Clearing the previous measurements may allow for the allocation of memory (see FIG. 2, 205) in the power telemetry controller 114 to another resource. In another implementation, the measurement may be retained in memory (see FIG. 2, 205) until the allocated memory is full.

Upon receipt of the measurements of the power supplied or power consumed, the main controller 118 may confirm that all measurements have been received and that all measurements are error free (e.g., readable and not corrupt). If any measurement is missing or contains errors, the main controller 118 may replace the measurements) containing an error or the missing measurements) with substitute data. The substitute data may be data obtained from the power telemetry controller 114. For example, the substitute data may be the stored maximum measurement in memory (see FIG. 2, 205) of the power telemetry controller 114.

In another implementation, if any measurement is missing, the main controller 118 may poll the power telemetry controller 114 associated with the missing measurement. If the power telemetry controller 114 does not send the missing measurement, the main controller 118 may repeat the polling of the power telemetry controller 114 until the earlier of (i) a receipt of the measurement of the of the power consumed by the one load element 106, or (ii) three contiguous polls of the power telemetry controller 114 without receipt of the measurement of the of the power consumed by the one load element 106. In an event in which the measurement is not received after three contiguous polls, the main controller 118 may shut down the power sources 104, as the lack of receipt may be indicative of a thermal event disrupting the communication between the main controller 118 and the power telemetry controller 114 in question. Shutting down the power sources 104 prevents the power sources 104 from supplying power to the remaining components of the electrical system 100, and thus, a thermal event if occurring.

Upon confirming all measurements have been received (or in other implementations, replacing any corrupt or missing measurements, or receiving a response after polling of the power telemetry controller 114), the measurements of the power supplied from each power source 104 are totaled, and the measurements of the power consumed by each load element 106 are totaled. A differential of the total power supplied and the total power consumed is determined by subtracting the difference. The differential is compared to a predetermined threshold. The predetermined threshold may vary depending on the exact state/configuration of the electrical system 100. In one or more implementations, the predetermined threshold may be based on acceptable measurement errors for each of the power telemetry controllers 114. Instances in which the differential exceeds the predetermined threshold may be indicative of a thermal event. In such instances, the main controller 118 shuts down the power sources 104 to prevent the power sources 104 from supplying power to the remaining components of the electrical system 100, and thus, from supplying power to the thermal event.

Referring now to FIG. 2 with continued reference to FIG. 1, FIG. 2 is a block diagram of a power telemetry controller 200 communicatively coupled to the network shown in FIG. 1, according to one or more examples of the disclosure. The power telemetry controller 200 may be suitable for use in place of any of the power telemetry controllers 114 depicted in FIG. 1. The power telemetry controller 200 may include a communications interface, such as network interface 202, communicatively coupled to the network 116 and one or more processors 204 (one shown). A memory 205 may be communicatively coupled to the processor(s) 204 and the network interface 202 and may be or include a non-transitory computer-readable medium 206. As provided above, the memory 205 may store the measurements provided by the respective power telemetry controller 200. As illustrated in FIG. 2, the non-transitory computer-readable medium 206 may store instructions 208 that, when executed by the processor(s) 204, cause the processor(s) 204 to: measure the power supplied or consumed during an interval (block 210); store the measured power; compare the most recently stored measured power to a stored maximum power measurement (block 212); and replace the stored maximum power measurement with the most recently stored measured power if the most recently stored measured power is greater than the maximum stored power measurement (block 214).

The non-transitory computer-readable medium 206 may further store instructions 208 that, when executed by the processor(s) 204, cause the processor(s) 204 to transmit the stored measured power to the main controller 118 after the interval (block 216), and to clear the memory of the stored measured power after receiving verification of the receipt of the stored measured power by the main controller 118 (block 218). Moreover, the instructions 208 may be configured to cause the processor 204 to perform any of the operations of the methods 400, 500, 600, and/or 700, which are described in greater detail below. The non-transitory computer-readable storage medium 206 may be integrated in the power telemetry controller 200 as shown in FIG. 2, or the non-transitory computer-readable storage medium 206 may be separate from but accessible to the power telemetry controller 200.

In one example, the stored instructions 208 can be part of an installation package that when installed can be executed by the processor(s) 204 to implement the electrical system 100 as provided in more detail below. In this case, the non-transitory computer-readable storage medium 206 may be a portable medium such as a compact disc (CD), digital video disc (DVD), or flash drive or a memory maintained by a server from which the installation package can be downloaded or installed. In another example, the stored instructions 208 may be part of an application or applications already installed. Here, the non-transitory computer-readable storage medium 206 can include integrated memory such as hard drive, solid state drive, and the like.

Although the example illustrated in FIG. 2 shows the power telemetry controller 200 being implemented with a processor 204 that is to execute instructions 208, it should be understood that the power telemetry controller 200 could also be implemented, in whole or in part, using dedicated hardware, such as application-specific integrated circuits (ASICs), complex programmable logic devices (CPLD), and so on. In general, the power telemetry controller 200 may include logic that is to measure the power supplied or consumed during an interval; store the measured power; compare the measured power to a maximum stored power measurement; replace the maximum stored power measurement with the measured power if the measured power is greater than the maximum stored power measurement; transmit the stored measured power to the main controller 118 after the interval; and clear the memory of the stored measured power after receiving verification of the receipt of the stored measured power by the main controller 118, and this logic may include any combination of processors (such as the processor(s) 204), machine readable instructions (such as the instructions 208), and dedicated hardware.

Figure 3:
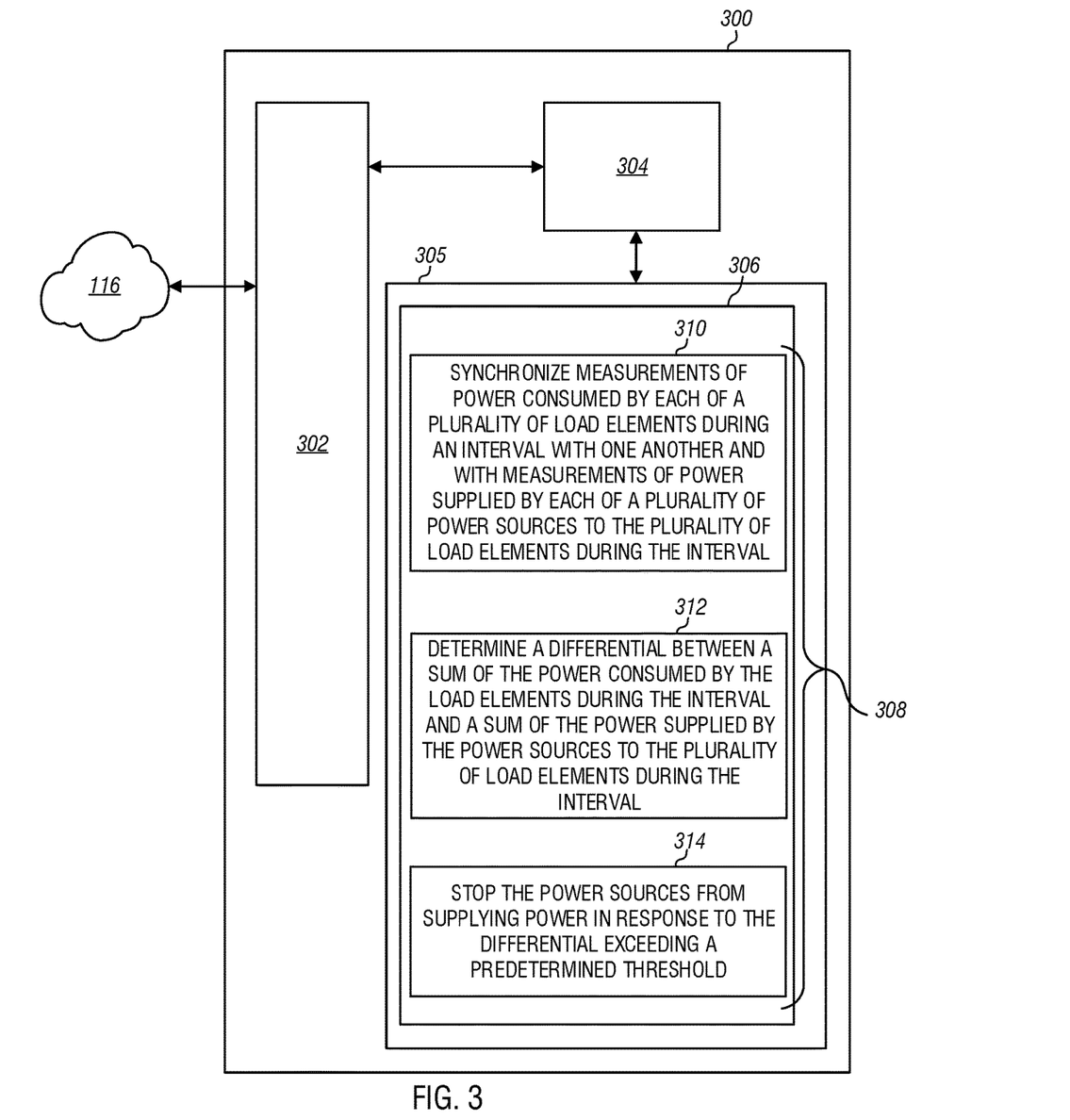
FIG. 3 is a block diagram of a main controller communicatively coupled to the network shown in FIG. 1, according to one or more examples of the disclosure.

Referring now to FIG. 3 with continued reference to FIGS. 1 and 2, FIG. 3 is a block diagram of a main controller 300 communicatively coupled to the network shown in FIG. 1, according to one or more examples of the disclosure. The main controller 300 may be suitable for use in place of the main controller 118 depicted in FIG. 1. The main controller 300 may include a network interface 302 communicatively coupled to the network 116 and one or more processors 304 (one shown). In one or more implementations, the processor 304 may generate the logic signal.

A memory 305 may be communicatively coupled to the processor(s) 304 and the network interface 302 and may be or include a non-transitory computer-readable medium 306. As illustrated in FIG. 3, the non-transitory computer-readable medium 306 may store instructions 308 that, when executed by the processor(s) 304, cause the processor(s) 304 to: synchronize measurements of power consumed by each of a plurality of load elements 106 during an interval with one another and with measurements of power supplied by each of a plurality of power sources 104 to the plurality of load elements 106 during the interval (block 310); determine a differential between a sum of the power consumed by the load elements 106 during the interval and a sum of the power supplied by the power sources 104 to the plurality of load elements 106 during the interval (block 312); and stop the power sources 104 from supplying power in response to the differential exceeding a predetermined threshold (block 314).

Moreover, the instructions 308 may be configured to cause the processor 304 to perform any of the operations of the methods 400, 500, 600, and/or 700, which are described in greater detail below. The non-transitory computer-readable storage medium 306 may be integrated in the main controller 300 as shown in FIG. 3, or the non-transitory computer-readable storage medium 306 may be separate from but accessible to the main controller 300.

In one example, the stored instructions 308 can be part of an installation package that when installed can be executed by the processor(s) 304 to implement the electrical system 100 as provided in more detail below. In this case, the non-transitory computer-readable storage medium 306 may be a portable medium such as a compact disc (CD), digital video disc (DVD), or flash drive or a memory maintained by a server from which the installation package can be downloaded or installed. In another example, the stored instructions 308 may be part of an application or applications already installed. Here, the non-transitory computer-readable storage medium 306 can include integrated memory such as hard drive, solid state drive, and the like.

Although the example illustrated in FIG. 3 shows the main controller 300 being implemented with a processor 304 that is to execute instructions 308, it should be understood that the main controller 300 could also be implemented, in whole or in part, using dedicated hardware, such as application-specific integrated circuits (ASICs), complex programmable logic devices (CPLD), and so on. In general, the main controller 300 may include logic that is to: synchronize measurements of power consumed by each of a plurality of load elements 106 during an interval with one another and with measurements of power supplied by each of plurality of power sources 104 to the plurality of load elements 106 during the interval; determine a differential between a sum of the power consumed by the load elements 106 during the interval and a sum of the power supplied by the power sources 104 to the plurality of load elements 106 during the interval; and stop the power sources 104 from supplying power in response to the differential exceeding a predetermined threshold, and this logic may include any combination of processors (such as the processor(s) 304), machine readable instructions (such as the instructions 308), and dedicated hardware.

Example methods 400, 500, 600, and 700 for operating the electrical system 100 may now be discussed, in the context of FIGS. 1-3, and with reference to FIGS. 4-7. The example methods 400, 500, 600, and/or 700 may be performed, for example, by controllers of an electrical system 100, such as the power telemetry controller 200 and main controller 300. For example, the power telemetry controllers 200 and main controller 300 may execute respective instructions 208 and 308 that cause the power telemetry controller 200 and main controller 300 to perform some or all of the operations of the methods 400, 500, 600, and/or 700. As another example, the power telemetry controllers 200 and main controller 300 may include dedicated hardware that performs some or all of the operations of the methods 400, 500, 600, and/or 700.

Figure 4:
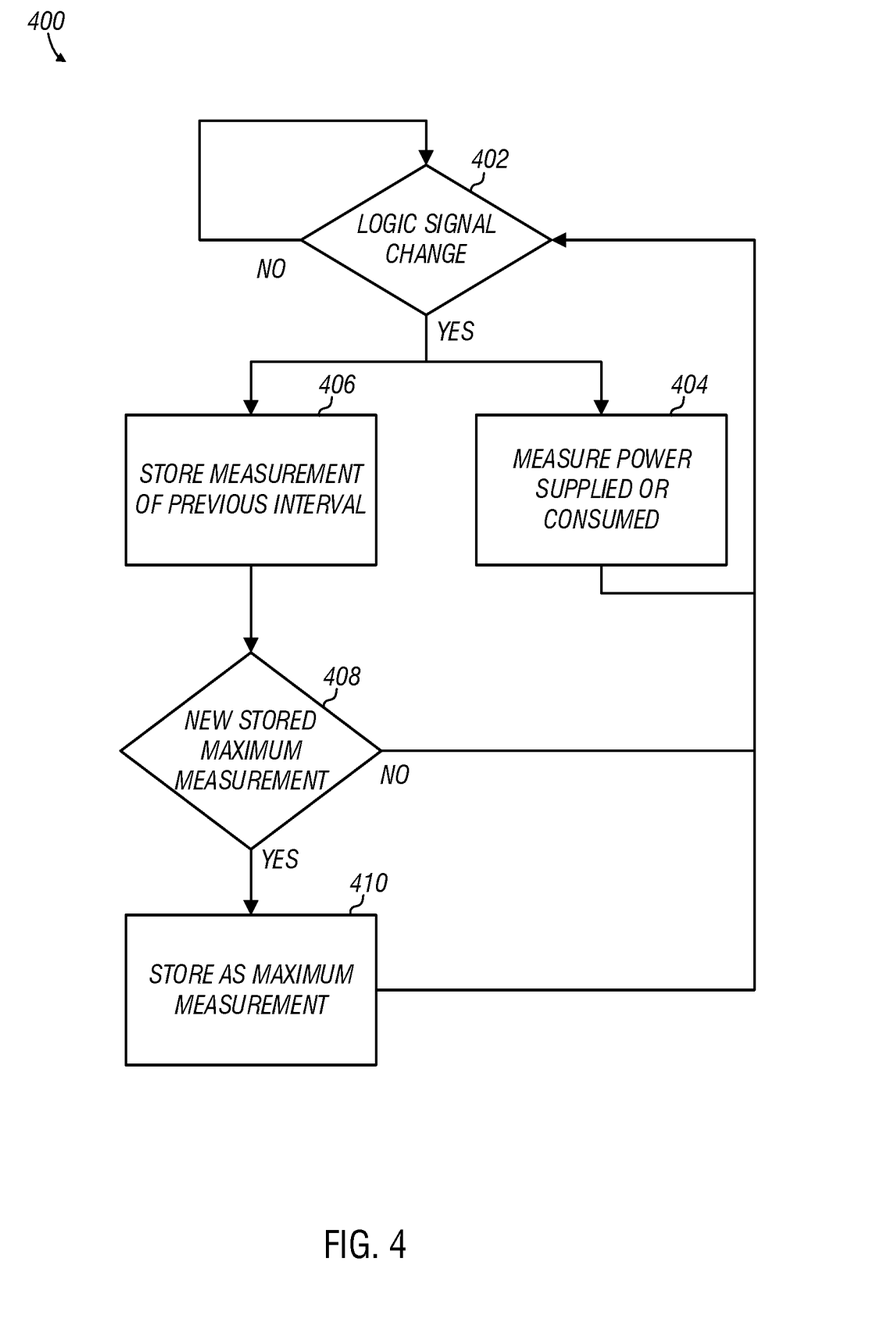
FIG. 4 is a flow chart of a method for operating an electrical system, according to one or more examples of the disclosure.

Referring now to FIG. 4 with continued reference to FIGS. 1-3, FIG. 4 is a flowchart depicting a method 400 for operating an electrical system, according to one or more examples of the disclosure. In discussing FIG. 4, reference is made to the electrical system 100 of FIG. 1 and the power telemetry controller 200 of FIG. 2 and the main controller 300 of FIG. 3 to provide contextual examples. Implementation, however, is not limited to those examples.

The method 400 starting at block 402 may include monitoring a received logic signal in each power telemetry controller 200 for a change in state. The logic signal may be received from the main controller 300. If a change in state is not received, each power telemetry controller 200 continues to monitor the logic signal transmitted from the main controller 300. If a logic signal having a change in state is received in each power telemetry controller 200, the change in state of the logic signal triggers the beginning of an interval in which each power telemetry controller 200 measures the power supplied (in the case of the power sources 104) or the power consumed (in the case of the load elements 106 and load subelements 110), as at block 404. As the beginning and end of each interval is based on consecutive changes in state of the logic signal received by each power telemetry controller 200, the intervals may be synchronized. Concurrent with block 404, the measurement of the power supplied or consumed from the previous interval is stored in memory of the power telemetry controller 200, as at block 406.

As at block 408, each stored measurement may be compared to a previously stored maximum power measurement in memory 205. If the stored measurement is less than the stored maximum power measurement, the method 400 returns to block 402. In the event the stored measurement is greater than the stored maximum power measurement, the stored maximum measurement is replaced with the stored measurement, as at block 410. The method 400 may return to block 402 to monitor for a change in the state of the logic signal. Measurement of the power consumed or supplied may continue at block 404 until a change in state of the logic signal occurs at block 402. At the occurrence of a change in state of the logic signal at block 402, the interval ends and a new interval begins.

Figure 5:
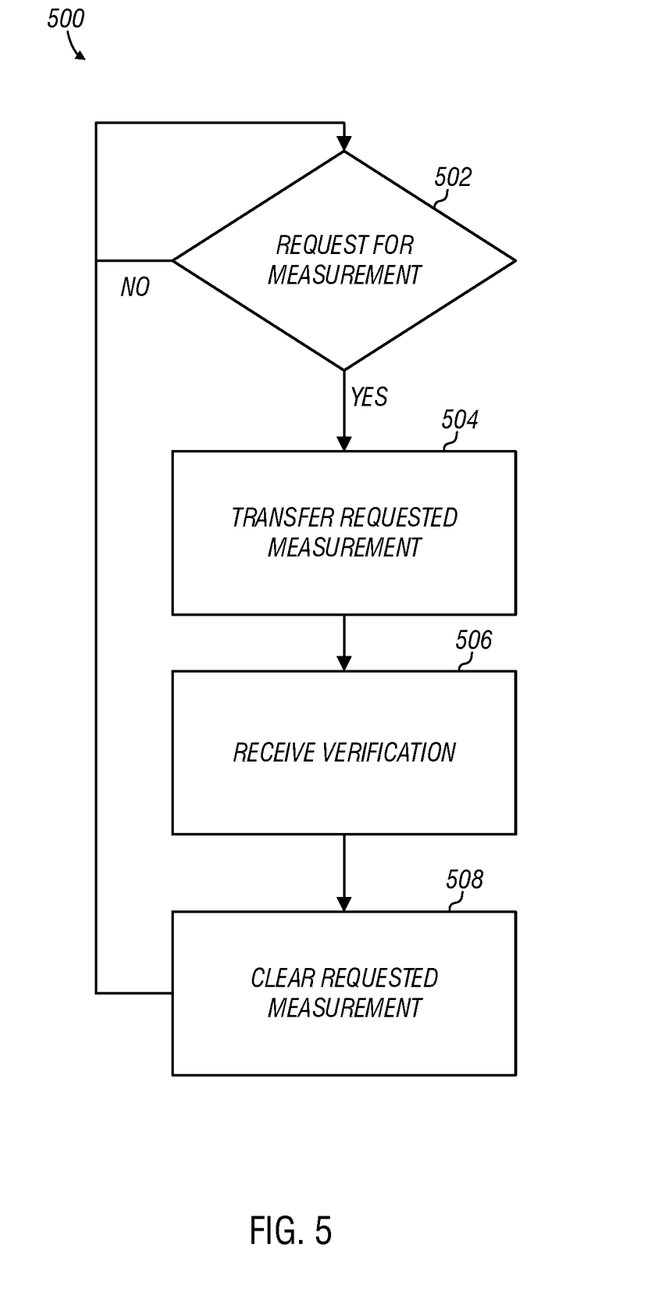
FIG. 5 is a flow chart of a method for operating an electrical system, according to one or more examples of the disclosure.

Turning now to FIG. 5 with continued reference to FIGS. 1-3, FIG. 5 is a flowchart depicting a method 500 for operating an electrical system, according to one or more examples of the disclosure. In discussing FIG. 5, reference is made to the electrical system 100 of FIG. 1 and the power telemetry controller 200 of FIG. 2 and the main controller 300 of FIG. 3 to provide contextual examples. Implementation, however, is not limited to those examples.

The method 500 starting at block 502 may include monitoring in each power telemetry controller 200 for a request by the main controller 300 for the respective measurement for the previous interval stored in the memory 205. If a request for the measurement is not received, each power telemetry controller 200 continues to monitor for a request by the main controller 300. In one or more implementations, if the request for measurement is not received within a specified time period, the respective power telemetry controller 200 may shut down, as the lack of a request may be indicative of a thermal event interrupting the signal path from the main controller 300. If the request by the main controller 300 is received in each power telemetry controller 200, the measurements by each power telemetry controller 200 stored in memory 205 are transmitted after the interval to the main controller 300, as at block 504.

After transmitting the measurement of the power supplied or power consumed, the main controller 300 may send verification of the receipt of the measurement to the respective power telemetry controller 200, as at block 506. Upon receipt of the verification, the power telemetry controller 200 may clear the measurement taken during the previous interval from the memory 205, as at 508. The method 500 may return to block 502 to await another request from the main controller 300 for the next interval.

Figure 6:
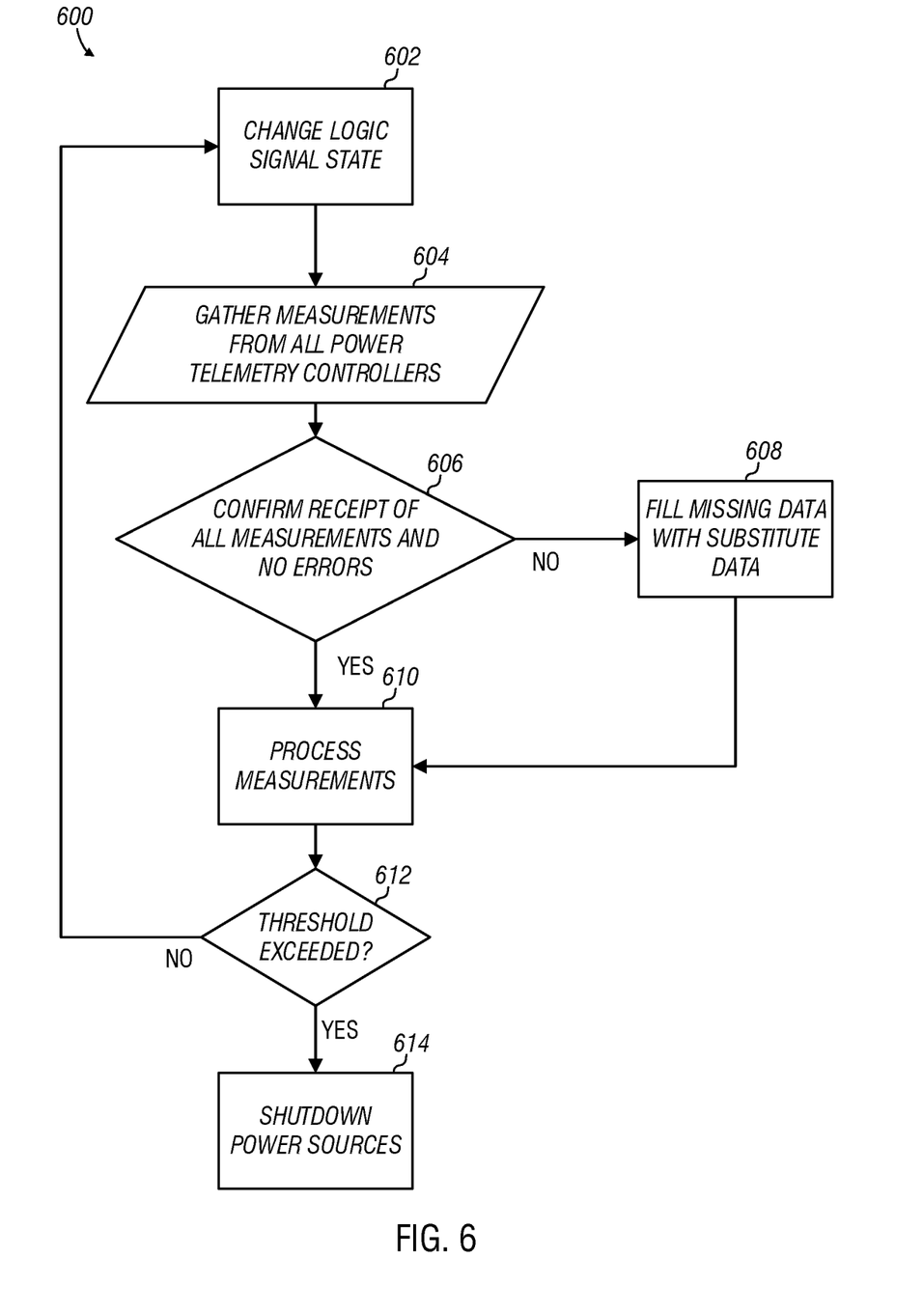
FIG. 6 is a flow chart of a method for operating an electrical system, according to one or more examples of the disclosure.

Referring now to FIG. 6 with continued reference to FIGS. 1-3, FIG. 6 is a flowchart depicting a method 600 for operating an electrical system, according to one or more examples of the disclosure. In discussing FIG. 6, reference is made to the electrical system 100 of FIG. 1 and the power telemetry controller 200 of FIG. 2 and the main controller 300 of FIG. 3 to provide contextual examples. Implementation, however, is not limited to those examples.

The method 600 starting at block 602 may include changing a state of the logic signal generated by the main controller 300. At each change of state, the main controller 300 may poll each power telemetry controller 200 for the measurement from the previous interval, as at block 604. As at block 606, upon receipt of the measurements of the power supplied or power consumed, the main controller 300 may confirm that all measurements have been received and that all measurements are error free (e.g., readable and not corrupt). If any measurement is missing or contains errors, the main controller 300 may replace the measurement(s) containing an error or the missing measurement(s) with substitute data, as at 608. The substitute data may be data obtained from the power telemetry controller 200. For example, the substitute data may be the stored maximum measurement in the memory 205 of the power telemetry controller 200.

In another implementation, if any measurement is missing or contains errors, the main controller 300 may poll the power telemetry controller 114 associated with the missing measurement (block 502). If the power telemetry controller 114 does not send the missing measurement, the main controller 118 may repeat the polling of the power telemetry controller 114 until the earlier of (i) a receipt of the measurement of the of the power consumed by the one load element 106, or (ii) three contiguous polls of the power telemetry controller 114 without receipt of the measurement of the of the power consumed by the one load element 106. In an event in which the measurement is not received after three contiguous polls, the main controller 300 may shut down the power sources 104 to prevent the power sources 104 from supplying power to the remaining components of the electrical system 100, and thus, the thermal event.

Upon confirming all measurements have been received or replacing any corrupt or missing measurements, the measurements of the power supplied from each power source 104 are totaled, and the measurements of the power consumed by each load element 106 and load subelement 110 are totaled, and a differential of the total power supplied and the total power consumed is determined by subtracting the difference, as at 610. The differential is compared to a predetermined threshold, as at 612. Instances in which the differential exceeds the predetermined threshold may be indicative of a thermal event. In such instances, the main controller 300 shuts down the power sources 104 to prevent the power sources 104 from supplying power to the remaining components of the electrical system 100, as at 614.

To avoid potential false positive identification of a thermal event, in one or more implementations, after determination that the predetermined threshold has been exceeded at block 612, the method 600 may be repeated for a plurality of intervals to ensure that a false positive identification of a thermal event has not occurred before shutting down the power sources 104. Accordingly, the method 600 may be repeated for a plurality of intervals. A confirmation of a thermal event in such implementations may be confirmed after three consecutive intervals in which a thermal event is detected. In other implementations, a confirmation of a thermal event in such implementations may be confirmed after a thermal event is detected in at least n intervals (e.g., 3 intervals) out of m intervals (e.g., 10 intervals).

In one or more implementations, each power telemetry controller 200 or the respective load subelement 110 communicatively coupled to the power telemetry controller 200 may store data depicting a maximum threshold, such as the maximum allowable current consumption, maximum sustained current consumption, maximum rate of current consumption change, or other pertinent indicators of "worst case" allowable norms in memory 205. In effect, this data describes allowable operating conditions to the main controller 300. The main controller 300 may detect potential thermal events by comparing measured operating parameters from individual load subelements 110 with their maximum thresholds, likewise, load elements 106 may be compared with the combined maximum thresholds of their load subelements 110.

Figure 7:
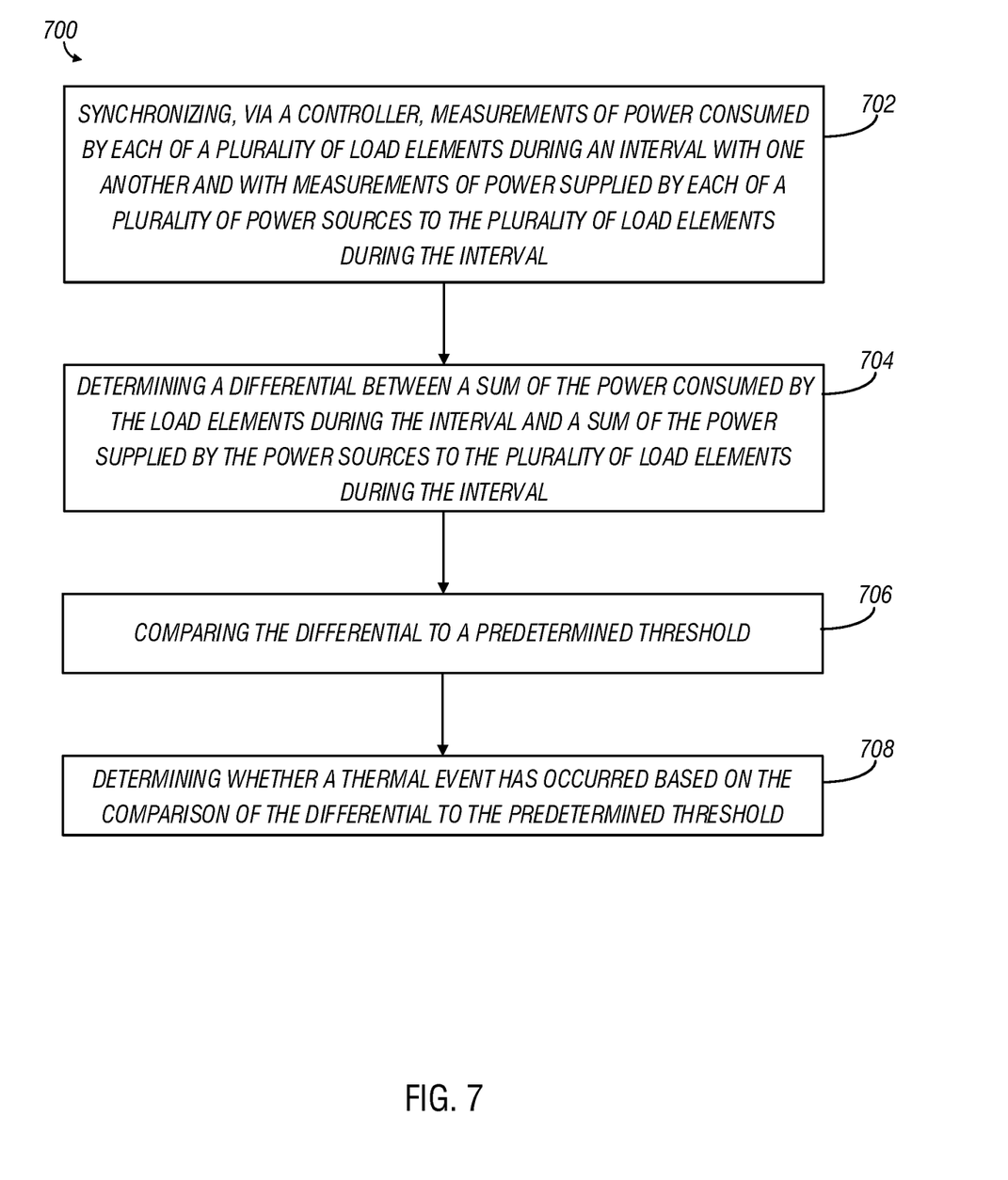
FIG. 7 is a flow chart of a method for detecting thermal events in an electrical system, according to one or more examples of the disclosure.

FIG. 7 is a flowchart depicting a method 700 for detecting thermal events in an electrical system, according to one or more examples of the disclosure. In discussing FIG. 7, reference is made to FIGS. 1-3 to provide contextual examples. Implementation, however, is not limited to those examples.

The method 700 may start at block 702 and includes synchronizing, via a controller 300, measurements of power consumed by each of a plurality of load elements 106 during an interval with one another and with measurements of power supplied by each of plurality of power sources 104 to the plurality of load elements 106 during the interval. The method 700 may also include determining a differential between a sum of the power consumed by the load elements 106 during the interval and a sum of the power supplied by the power sources 104 to the plurality of load elements 106 during the interval, as at block 704. The method 700 may further include comparing the differential to a predetermined threshold, as at block 706. The method 700 may also include determining whether a thermal event has occurred based on the comparison of the differential to the predetermined threshold, as at block 708.

In some implementations, the method 700 may also include stopping the power sources from supplying power in response to the differential exceeding the predetermined threshold. In some implementations of the method 700, the controller 300 includes a processor 304 to generate a logic signal, and the measurements of the power consumed by each of the load elements 106 and the measurements of the power supplied by each of the power sources 104 are synchronized with a change in state of the logic signal, and the interval is the time between the change in state of the logic signal. In some implementations, the method 700 may further include transmitting the measurements of the power consumed by each of the load elements 106 during the interval and the measurements of the power supplied by each of the power sources 104 during the interval to the controller 300 after each change in state of the logic signal.

In some implementations, the method 700 may also include confirming each measurement of the power consumed by each of the load elements 106 has been received by the controller 300, and in the event a measurement of the power consumed by one of the load elements 106 is not received by the controller 300, substituting historical data for the measurement of the power consumed by the one load element 106 not received.

In some implementations, the method 700 may also include confirming each measurement of the power consumed by each of the load elements 106 has been received by the controller 300, and in the event a measurement of the power consumed by one of the load elements 106 is not received by the controller 300, polling a power telemetry controller 200 associated with the one load element 106 for the measurement of the power consumed by the one load element 106 not received until the earlier of (i) a receipt of the measurement of the power consumed by the one load element 106, or (ii) three contiguous polls of the power telemetry controller 200 without receipt of the measurement of the of the power consumed by the one load element 106.

In some implementations, the method 700 may also include storing each measurement of power consumed by a respective load element 106 during the interval in a respective memory 205; comparing each measurement of power consumed by the respective load element 106 with a maximum measurement of power consumed by the respective load element 106 during a previous interval and stored in the respective memory 205; and if the measurement of power consumed by the respective load element 106 is greater than the maximum measurement of power consumed by the respective load element 106 during the previous interval, replacing the maximum measurement of power consumed by the respective load element 106 during the previous interval with the measurement of power consumed by the respective load element 106 in the respective memory 205 during the interval.

In some implementations, the method 700 may also include comparing an operating parameter of one of the load elements 106 during the interval with a maximum threshold associated with the operating parameter; and stopping the power sources 104 from supplying power in response to the operating parameter exceeding the maximum threshold during the interval.

As used herein, a "processor" may include any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc.

As provided above, examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for detecting thermal events in an electrical system, comprising:

synchronizing, via a controller, measurements of power consumed by each of a plurality of load elements during an interval with one another and with measurements of power supplied by each of a plurality of power sources to the plurality of load elements during the interval;

determining a differential between a sum of the power consumed by the load elements during the interval and a sum of the power supplied by the power sources to the plurality of load elements during the interval;

comparing the differential to a predetermined threshold; and determining whether a thermal event has occurred based on the comparison of the differential to the predetermined threshold.

2. The method of claim 1, further comprising stopping the power sources from supplying power in response to the differential exceeding the predetermined threshold.

3. The method of claim 1, wherein:
the controller includes a processor to generate a logic signal; and
the measurements of the power consumed by each of the load elements and the measurements of the power supplied by each of the power sources are synchronized with a change in state of the logic signal, and the interval is the time between the change in state of the logic signal.

4. The method of claim 3, further comprising transmitting the measurements of the power consumed by each of the load elements during the interval and the measurements of the power supplied by each of the power sources during the interval to the controller after each change in state of the logic signal.

5. The method of claim 4, further comprising:
confirming each measurement of the power consumed by each of the load elements has been received by the controller; and
in the event a measurement of the power consumed by one of the load elements is not received by the controller, substituting historical data for the measurement of the power consumed by the one load element not received.

6. The method of claim 4, further comprising:
confirming each measurement of the power consumed by each of the load elements has been received by the controller; and
in the event a measurement of the power consumed by one of the load elements is not received by the controller,
polling a power telemetry controller associated with the one load element for the measurement of the power consumed by the one load element not received until the earlier of (i) a receipt of the measurement of the power consumed by the one load element, or (ii) three contiguous polls of the power telemetry controller without receipt of the measurement of the of the power consumed by the one load element.

7. The method of claim 1, further comprising:
storing each measurement of power consumed by a respective load element during the interval in a respective memory;
comparing each measurement of power consumed by the respective load element with a maximum measurement of power consumed by the respective load element during a previous interval and stored in the respective memory; and
if the measurement of power consumed by the respective load element is greater than the maximum measurement of power consumed by the respective load element during the previous interval, replacing the maximum measurement of power consumed by the respective load element during the previous interval with the measurement of power consumed by the respective load element in the respective memory during the interval.

8. The method of claim 1, further comprising:
comparing an operating parameter of one of the load elements during the interval with a maximum threshold associated with the operating parameter; and
stopping the power sources from supplying power in response to the operating parameter exceeding the maximum threshold during the interval.

9. An electrical system comprising:
a plurality of power sources operating in parallel with one another to supply power;
a plurality of load elements to be powered by the plurality of power sources;
a first plurality of power telemetry controllers, each power telemetry controller communicatively coupled to a respective load element to measure the power consumed by the respective load element during an interval;
a second plurality of power telemetry controllers, each power telemetry controller of the second plurality of power telemetry controllers communicatively coupled to a respective power source to measure the power supplied by the respective power source during the interval;
a main controller communicatively coupled to each of the first plurality and second plurality of power telemetry controllers; and
a computer-readable storage medium comprising instructions executable by the main controller to:
synchronize measurements of the power consumed by each of the load elements during the interval with one another and with measurements of the power supplied by each of the power sources during the interval;
determine a differential between a sum of the power consumed by the load elements during the interval and a sum of the power supplied by the power sources during the interval; and
stop the power sources from supplying power in response to the differential exceeding a predetermined threshold.

10. The electrical system of claim 9, wherein:
the main controller includes a processor to generate a logic signal; and
the measurements of the power consumed by each of the load elements and the measurements of the power supplied by each of the power sources are synchronized with a change in state of the logic signal, and the interval is the time between the change in state of the logic signal.

11. The electrical system of claim 9, wherein the computer-readable storage medium comprises further instructions executable by the main controller to:
confirm each measurement of the power consumed by each of the load elements has been received by the main controller; and
in the event a measurement of the power consumed by one of the load elements is not received by the main controller,
poll a power telemetry controller associated with the one load element for the measurement of the power consumed by the one load element not received until the earlier of (i) a receipt of the measurement of the power consumed by the one load element, or (ii) three contiguous polls of the power telemetry controller without receipt of the measurement of the of the power consumed by the one load element.

12. The electrical system of claim 9, wherein the computer-readable storage medium comprises further instructions executable by the main controller to:
synchronize measurements of the power consumed by each of the load elements during a plurality of intervals with one another and with measurements of the power supplied by each of the power sources during the plurality of intervals;
determine a differential between a sum of the power consumed by the load elements and a sum of the power supplied by the power sources during each interval of the plurality of intervals;
compare each differential with the predetermined threshold; and
stop the power sources from supplying power in response to a plurality of differentials exceeding the predetermined threshold.

13. The electrical system of claim 12, wherein the plurality of differentials are determined from at least three intervals of the plurality of intervals.

14. The electrical system of claim 9, wherein the computer-readable storage medium comprises further instructions executable by the main controller to:
compare an operating parameter of one of the load elements during the interval with a maximum threshold associated with the operating parameter; and
stop the power sources from supplying power in response to the operating parameter exceeding the maximum threshold during the interval.

15. The electrical system of claim 14, wherein the one load element includes a plurality of load subelements, and the computer-readable storage medium comprises further instructions executable by the main controller to:
determine a value for an operating parameter of each load subelement during the interval;
sum the operating parameters of the load subelements;
determine a maximum threshold associated with each load subelement;
sum the maximum thresholds of the load subelements;
compare the sum of the operating parameters of the load subelements during the interval with the sum of the maximum thresholds associated with the load subelements; and
stop the power sources from supplying power in response to the sum of the operating parameters of the load subelements exceeding the maximum thresholds associated with the load subelements during the interval.

16. The electrical system of claim 9, wherein:
each power telemetry controller of the first plurality of power telemetry controllers includes a memory associated with a respective load element to store the measurement of power consumed by the respective load element during the interval,
wherein the computer-readable storage medium further comprises instructions executable by each power telemetry controller of the first plurality of power telemetry controllers to:
store the measurement of power consumed by the respective load element during the interval;
transfer the measurement of power consumed by the respective load element during the interval to the main controller;
compare the measurement of power consumed by the respective load element during the interval to a maximum measurement of power consumed by the respective load element during a previous interval stored in the memory; and
if the measurement of power consumed during the interval is greater than the maximum measurement of power consumed by the respective load element during the previous interval stored in the memory, store the measurement of power in the memory as the maximum measurement of power consumed.

17. A non-transitory computer-readable medium comprising computer executable instructions stored thereon that when executed by a processor, cause the processor to:
synchronize measurements of power consumed by each of a plurality of load elements during an interval with one another and with measurements of power supplied by each of a plurality of power sources to the plurality of load elements during the interval;
determine a differential between a sum of the power consumed by the load elements during the interval and a sum of the power supplied by the power sources to the plurality of load elements during the interval; and
stop the power sources from supplying power in response to the differential exceeding a predetermined threshold.

18. The non-transitory computer-readable medium of claim 17, wherein:
the processor generates a logic signal; and
the measurements of the power consumed by each of the load elements and the measurements of the power supplied by each of the power sources are synchronized with a change in state of the logic signal, and the interval is the time between the change in state of the logic signal.

19. The non-transitory computer-readable medium of claim 17, further comprising computer executable instructions stored thereon that when executed by the processor, cause the processor to:
confirm each measurement of the power consumed by each of the load elements has been received by the processor; and
in the event a measurement of the power consumed by one of the load elements is not received by the processor, poll a power telemetry controller associated with the one load element for the measurement of the power consumed by the one load element not received until the earlier of (i) a receipt of the measurement of the power consumed by the one load element, or (ii) three contiguous polls of the power telemetry controller without receipt of the measurement of the of the power consumed by the one load element.

20. The non-transitory computer-readable medium of claim 17, further comprising computer executable instructions stored thereon that when executed by the processor, cause the processor to:
synchronize measurements of the power consumed by each of the load elements during a plurality of intervals with one another and with measurements of the power supplied by each of the power sources during the plurality of intervals;
determine a differential between a sum of the power consumed by the load elements and a sum of the power supplied by the power sources during each interval of the plurality of intervals;
compare each differential with the predetermined threshold; and stop the power sources from supplying power in response to a plurality of differentials exceeding the predetermined threshold.

* * * * *